G. F. ROLLAND

May 23, 1933. ELECTRIC IGNITION DEVICE Re. 18,837

Original Filed May 29, 1930

INVENTOR.
GUY F. ROLLAND,
BY Samuel Herrick
ATTORNEY.

Reissued May 23, 1933

Re. 18,837

UNITED STATES PATENT OFFICE

GUY F. ROLLAND, OF TAMAQUA, PENNSYLVANIA, ASSIGNOR TO ATLAS POWDER COMPANY, OF WILMINGTON, DELAWARE, A CORPORATION OF DELAWARE

ELECTRIC IGNITION DEVICE

Original No. 1,856,431, dated May 3, 1932, Serial No. 457,022, filed May 29, 1930. Application for reissue filed January 26, 1933. Serial No. 653,740.

This invention relates to certain new and useful improvements in electric ignition devices, commonly known to those versed in the art as electric squibs. The function of commercial electric squibs is to initiate or fire charges of deflagrating or low explosives, such, for example, as granular black powder, pelleted black powder, and the like.

The object of the invention is to provide an electric squib which will have greater water and moisture resistance, greater safety in handling and more positive action in the firing of charges of low explosives than any commercial electric squib known at the present time.

The conventional form of electric squib consists of an electric igniting element around which is formed an inflammable mass or firing composition. The igniting element and firing composition are usually placed in a paper or metal tube, one end of which is sealed and the other or firing end of which is fitted with one or more vents to allow for the escape of the flash caused by the firing composition. When the vents are on the ends of the tubes, they are usually closed by means of corks or other kinds of stoppers. However, when metal shells are employed, it has, heretofore, been the practice to fit them with one or more side wall vents and without end vents. In such cases, the vents are always left unclosed. In the case of the paper tube type of squib, closed with a stopper to protect it from moisture, manufacturers recommend either that the stoppers be removed just prior to use or that a notch be cut in the side wall of the paper tube, in order to assure good ignition.

In use, the electric squib is placed in contact with or in close relation to a charge of low explosive, such as black powder. The flash of the electric squib gives the heat and flame necessary to cause ignition of the charge. Heretofore, an electric squib provided with a paper tube has been generally used. It has been found that this squib, even when fitted with a stopper in its vent hole, is very susceptible to the effects of moisture; to which it may be exposed in storage or prior to use, and, thus, it may be rendered entirely worthless for the purpose for which it was intended. In addition to the above mentioned weakness, it has been found that the electric squib made with the paper tube is not sufficiently strong to withstand the crushing blows to which it is subjected, while the charge is being tamped in the bore hole, so that it collapses and sometimes causes a premature explosion of the black powder charge, with which it is in contact, and results in possibly fatal injury to the user.

An electric squib made with a metal shell with one or more vent holes, either in the side wall or bottom, is more rigid than that made with the paper tube and thus it is not as liable to cause a premature explosion. However, it has the same decided defect, common to the paper tube electric squib, in that it is very susceptible to the effects of moisture. This causes electric squibs, embodying metal shells provided with open vents to function poorly and, in many cases, to misfire completely.

The present invention overcomes the above mentioned difficulties and defects which are inherent in the present types of electric squibs.

I have devised an electric squib which is completely moisture proof, is of sturdy and rigid construction and functions very satisfactorily in the ignition of low explosives, such as black powder, even under the most adverse conditions, while at the same time, it may be economically manufactured from readily available, easily workable and inexpensive materials.

This electric squib consists of a closed metal shell, preferably of aluminum, containing sealed therein an electric igniting element surrounded by a firing composition, and, in addition, an auxiliary inflammable mass, preferably in pulverulent or granular form, such as black powder, between the flash composition on the igniting element and the bottom of the closed metal shell. When the igniting element is heated by the passage of an electric current, the heat causes the flash composition on the igniting element to burn with a flash, and this, in turn, ignites the auxiliary flash composition and bursts the shell. This produces and discharges a big flame directly into the charge of low explosive, such as black powder, igniting the same in a very positive and certain manner.

I have found that, if the shell is weakened at any particular place by a score or scratch in the metal, it will burst along this weakened line. In view of the fact that I have found it desirable to have the flash of the electric squib emitted from the side of the shell, I prefer to place a furrow, score or scratch, lengthwise, on the lower portion of the shell.

I have also found that, if the shell is not weakened at any particular place by a score or scratch in the metal, it will usually burst in the lower portion, but sometimes it will burst in the upper portion, the igniting element and sealing composition being blown away from the shell. It should be clearly understood that even though the flame from the flash composition on the igniting element and the auxiliary flash composition is vented through the upper end of the shell, due to the failure of the lower portion to burst, it will still function in the ignition of low explosives, such as black powder.

In view of the fact that I have found it desirable to insure that the shell will always burst in the lower portion, regardless of whether or not the shell has been weakened at any particular place by a score or scratch in the metal, I may accomplish this desired effect by placing one or more crimps in the shell at any desirable stage, during the assembly or after the assembly of the electric squib. The shell may be crimped with any suitable type of crimper or rolled to form any suitable type of inside bead in the portion of the shell surrounding the igniting element, or in the portion of the shell above the igniting element. This insures that the aluminum shell, with or without the weakening score or scratch, will always burst in the lower portion and the igniting element and sealing composition cannot be blown away from the shell.

I have found, for instance, that a crimp formed by a loop wire crimper in the portion of the shell surrounding the igniting element, functions very satisfactorily in this respect. However, it should be clearly understood that any form of crimper or beader, or indenter, may be used to obtain the desired effect. For example, a series of indentations in the shell would serve the same purpose as a continuous crimp or bead in the shell.

I have also found that the igniting element and sealing composition can be securely held in the shell if the open end of the shell is constricted or turned in, either before or after the igniting element and auxiliary flash composition have been inserted and either before or after the sealing composition has been placed therein.

It should be clearly understood that this electric squib may, under favorable conditions, function satisfactorily without the auxiliary inflammable mass, without the extra crimping or constriction and without the score in the shell, but that I prefer to employ these features as added safeguards and to insure the ignition of charges of low explosives, under most adverse conditions.

The fact that this metal electric squib is kept completely closed up to the moment of use, renders it wholly moisture proof, and thus it is an improvement on, and is superior to all known commercial electric squibs. In addition, since the shell is made of metal, or other sturdy material, it is not easily crushed and thus it is an improvement on, and is superior to electric squibs made with paper tubes.

In the accompanying drawing.

Like numerals designate corresponding parts in all the figures of the drawing.

Figure 1:
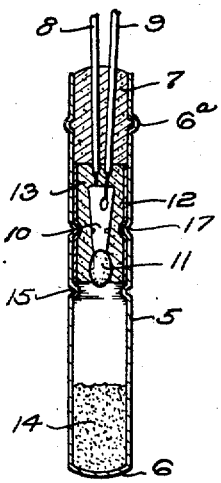
Figure 1 is a vertical sectional view.

Referring to Fig. 1, 5 designates a metallic shell that is closed at its inner end 6, and open at its outer end. This shell is, preferably, provided with a conventional bead 6*a* within which a sealing plug 7, of tar, sulphur or other well known material, engages. Lead-in wires, indicated at 8 and 9 conduct current to an electric match of conventional form, indicated at 10, and which comprises a match head or flash composition 11. This ignition device is contained within an insulating paper tube 12, said tube being filled with a sealing composition 13. by which the ignition device is held in said paper tube. The lower portion of the shell 5 contains a body of auxiliary flash composition 14. This may consist of grained black powder, or any other material of a nature adapted to serve the purposes described, and which will produce a considerable volume of flame, of the necessary temperature.

Figure 3:
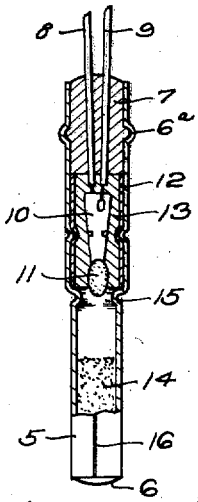
Figure 3 is a vertical sectional view of another embodiment of the invention.
Figure 4:
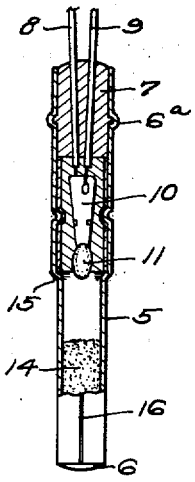
Figure 4 is a vertical sectional view of a third embodiment of the invention.

The lower portion of the shell may be weakened, as previously described, in many ways, as, for example, by providing the annular groove 15, or by scoring the shell vertically, as indicated at 16, at one or more points about its circumference, and I wish it understood that the invention is not limited to the particular way of weakening the shell. The shell is, preferably, further provided with an annular indentation 17, which prevents the ignition assembly from being blown out of the shell. The elements employed, in conjunction with the structure of Figs. 3 and 4 are substantially the same as those heretofore described, and the same reference characters have been employed. In all cases, the shell is of such material and thickness that it will be ruptured by the flash of the composition on the igniting element, or by the combustion of the auxiliary flash composition, or both.

I have found that an aluminum shell meets this bursting requirement in a highly satisfactory manner, especially when its wall thickness is about .0065″, and it is used in conjunction with an auxiliary flash composition. Aluminum has the further advantage that it is cheap, light and readily drawn into the shell form.

Figure 2:
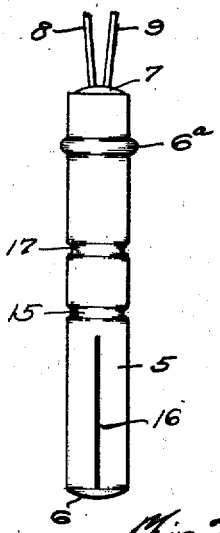
Figure 2 is a side elevation of one embodiment of the invention.

The shell may be made in any desired way. That is to say, it may be made without any crimped portions, or it may be provided with the two crimped portions illustrated in Figs. 1 and 2, or the lower portion of the shell may be constricted to form a stop for the igniting element, as illustrated in Figs. 3 and 4, the difference between these two figures being that, in Fig. 3, a distinct indentation or groove is formed to constitute a stop for the ignition element, the lower portion of the shell being of smaller diameter than the upper portion, while, in Fig. 4, the stop for the ignition element consists of a shoulder formed by making the lower portion of the shell of smaller diameter than the upper portion thereof.

Figure 5:
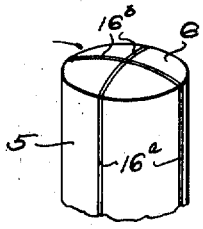
Figure 5 is a perspective view illustrating a manner of scoring the shell, which may be employed, if desired.

In Fig. 5, I have shown a fragmentary inverted view of the shell, wherein the scoring indicated at 16*a* is extended across the bottom of the shell, at 16*b*. in two directions, so that when the squib is fired, the entire lower end of the shell may flare out, or "mushroom" and leave a free passage for the large hot flame into the charge to be fired.

While I have made particular reference to aluminum as a material for making these shells, it will be understood that the invention is not restricted thereto. For example, the shell may be made from other metals, such as copper or non-metallic materials, such as a fiber composition.

While I have made particular reference to grained black powder as an auxiliary flash composition, it will be understood that the scope of my invention includes the use of any suitable deflagrating material. I wish it to be understood that by deflagrating material I means a material which will burn and produce a considerable volume of hot flame for the actual ignition of low explosive charges, in contradistinction to any materials or devices which function by concussion or detonation.

It is to be understood that the invention includes within its purview whatever changes fairly come within either the terms or the spirit of the appended claims.

Having described my invention, what I claim is:

1. A device of the character described, comprising a closed metallic shell, an electric ignition means therein, a firing composition ignited by said ignition means, an auxiliary deflagrating flash composition in the inner end of the shell adapted to ignite a charge of low explosive by the flame produced thereby, and means for weakening the lower portion of the shell to insure its rupture upon the ignition of the contents thereof.

2. An electric squib comprising a closed shell, an electric igniting element surrounded by a flash composition and an auxiliary deflagrating flash composition in the portion of the closed shell between the flash composition on the igniting element and the closed end of the shell, said shell being so constructed as to be burstable under the pressure generated by said deflagrating composition.

3. An electric squib comprising a closed shell with one or more weakening scores, furrows or scratches, an electric igniting element surrounded by a flash composition and an auxiliary black powder charge in the portion of the closed shell between the flash composition on the igniting element and the closed end of the shell, said shell being so constructed as to be burstable under the pressure generated by the black powder charge upon ignition.

4. An electric squib comprising a closed metal shell with one or more weakening scores, furrows or scratches, an electric igniting element surrounded by a flash composition and an auxiliary black powder charge in the portion of the closed shell between the flash composition on the igniting element and the closed end of the shell, said shell being so constructed as to be burstable under the pressure generated by the black powder charge upon ignition.

5. An electric squib comprising a closed aluminum shell with one or more weakening scores, furrows or scratches, an electric igniting element surrounded by a flash composition and an auxiliary black powder charge in the portion of the closed shell between the flash composition on the igniting element and the closed end of the shell.

6. A squib of the character described containing no charge that detonates therein when ignited and comprising a completely closed metallic shell, an electric ignition means therein, and a deflagrating flash composition in the inner portion of the shell adapted to rupture the said inner portion of the shell under the pressure produced by the burning of said composition and to deliver from the ruptured shell a volume of flame sufficient to ignite a charge of low explosive.

7. A squib comprising in combination, a completely closed metallic moisture proof shell, an electric igniting means therein and a flame producing and pressure generating charge associated with the igniting means within the shell and consisting of materials that are deflagrating and non-detonating under the conditions of use, said material being of such nature and in such amount with respect to the strength of the shell that the pressure generated upon ignition of said material is sufficient to burst said shell and to deliver such volume of flame therefrom as will serve to ignite a charge of low explosive such as black powder, said squib functioning wholly by ignition and without detonation in the setting off of such low explosive charges.

GUY F. ROLLAND.